(12) United States Patent
Palaniappa et al.

(10) Patent No.: US 12,510,562 B2
(45) Date of Patent: Dec. 30, 2025

(54) TEST SOCKET WITH CONDUCTIVE COMPRESSION CONTACTS FOR INTEGRATED CIRCUITS

(71) Applicant: Ironwood Electronics, Inc., Eagan, MN (US)

(72) Inventors: Ilavarasan M. Palaniappa, Inver Grove Heights, MN (US); David A. Struyk, Deephaven, MN (US)

(73) Assignee: Ironwood Electronics, Inc., Eagan, MN (US)

(*) Notice: Subject to any disclaimer, the term of this patent is extended or adjusted under 35 U.S.C. 154(b) by 189 days.

(21) Appl. No.: 18/464,465

(22) Filed: Sep. 11, 2023

(65) Prior Publication Data
US 2024/0094245 A1    Mar. 21, 2024

Related U.S. Application Data

(60) Provisional application No. 63/375,993, filed on Sep. 16, 2022.

(51) Int. Cl.
*G01R 1/04*    (2006.01)
*G01R 31/28*   (2006.01)

(52) U.S. Cl.
CPC ....... *G01R 1/0466* (2013.01); *G01R 31/2886* (2013.01)

(58) Field of Classification Search
CPC ............. G01R 1/0466; G01R 31/2886; G01R 1/0483; G01R 1/0416; G01R 31/2844
See application file for complete search history.

(56) References Cited

U.S. PATENT DOCUMENTS 6,066,957 A * 5/2000 Van Loan .......... G01R 1/07328
                                                    324/750.19
6,830,460 B1 * 12/2004 Rathburn ............... H05K 3/326
                                                         439/66

(Continued)

FOREIGN PATENT DOCUMENTS

JP    H11345919    12/1999
JP    2002022795    1/2002

(Continued)

OTHER PUBLICATIONS

Japan Patent Office, Notice of Reasons for Refusal dated Nov. 28, 2024, Japan counterpart application No. 2023-149523, filed Sep. 14, 2023.

(Continued)

*Primary Examiner* — Akm Zakaria
(74) *Attorney, Agent, or Firm* — Schroeder & Siegfried, P.A.

(57) ABSTRACT

A test socket for an electronic circuit device with protruding circuit contacts, the test socket including an underlying PCB substrate with an overlaying electrically insulative housing, where the PCB substrate includes an array of electrically conductive vias extending therethrough, and the housing includes an array of socket apertures which align with the PCB vias and contain resiliently compressible electrically conductive compression contacts therein that connect electrically with the conductive vias of the PBC substrate. The socket apertures each have peripheral retention flaps which engage and retain the protruding circuit contacts of the electronic circuit device in electrical engagement with the conductive compression contacts within the socket apertures during testing.

27 Claims, 7 Drawing Sheets

(56) References Cited

U.S. PATENT DOCUMENTS

| | | | |
|---|---|---|---|
| 7,045,889 | B2 | 5/2006 | Canella |
| 10,725,069 | B1* | 7/2020 | Nelson ................. G01R 1/0483 |
| 2002/0029902 | A1 | 3/2002 | Distefano et al. |
| 2003/0124895 | A1 | 7/2003 | Winter et al. |
| 2022/0236302 | A1* | 7/2022 | Barabi ............... G01R 1/07314 |

FOREIGN PATENT DOCUMENTS

| | | |
|---|---|---|
| KR | 200328984 | 10/2003 |
| KR | 101522624 | 5/2015 |
| TW | 200301592 | 7/2003 |
| TW | 202229889 | 8/2022 |

OTHER PUBLICATIONS

Taiwan Intellectual Property Office, Examination Report dated Sep. 23, 2024, Taiwan counterpart application No. 1112135217, filed Sep. 15, 2023.

Korean Intellectual Property Office, Notice of Preliminary Rejection dated Sep. 26, 2024, Korean counterpart application No. 10-2023-0122603, filed Sep. 14, 2023.

\* cited by examiner

FIG. 9A  FIG. 9B

TEST SOCKET WITH CONDUCTIVE COMPRESSION CONTACTS FOR INTEGRATED CIRCUITS

CROSS REFERENCE TO RELATED APPLICATIONS

This application is a nonprovisional patent application which claims the benefit of U.S. Provisional Application Ser. No. 63/375,993, filed on Sep. 16, 2022, entitled "Test Socket With Conductive Compression Contacts For High Performance Integrated Circuits," the contents of which are incorporated herein in their entirety by reference thereto.

FIELD OF INVENTION

The present invention relates generally to the art of test sockets for electronic circuit devices, such as integrated circuits, and more particularly to the construction of an improved test socket for high performance integrated circuits which incorporates conductive compression contacts for greater conductivity and design flexibility.

BACKGROUND

The statements in this section merely provide background information related to the present disclosure and may not constitute prior art.

Ball grid array (BGA) technology refers to a particular type of surface-mount packaging used for making permanent or semi-permanent connection of an integrated circuit to a printed circuit board (PCB). With BGA mounting, the conductive interconnection pins of conventional pin grid arrays or dual in-line packaging are replaced with an array of conductive circuit contacts or pads in the form of tiny solder balls on the underside of the integrated circuit. This provides for more connection points and shorter trace connections to the package leads, thus resulting in improved performance at higher speeds.

With technological advances, more and more products today are being designed for use with high-performance integrated circuits. In order to analyze and perfect the design of these products/circuits during development, test sockets are used to facilitate interconnection of a device under test (DUT) to a PCB. Without test sockets, the design, and testing, of such circuits would require multiple solder reflow attachments and detachments. In response to these demanding needs, sockets enable semi-permanent connection of the DUT to the main target PCB. However, making such an interconnect through a test socket necessarily increases the electrical signal path which inherently results in potential signal losses. High-performance applications demand that these signal losses be kept to a minimum, so the use of BGA technology with such sockets is deemed beneficial.

With conventional sockets, current contact technologies for BGA circuits typically employ a stamped metal cantilever beam known as a "Grypper" which extends through the body of the socket and connects each BGA solder ball of the DUT to the main target PCB. Views of such a "Grypper" contact and the manner in which it engages a solder ball is shown in FIGS. 1A, 1B & 1C of the drawings. As shown, upon insertion of the DUT within the test socket, each stamped metal cantilever beam grips an associated solder ball of the DUT. The opposite end of each beam is then solder attached to the main PCB. Notably, with this technology, the stamped metal beam has to be of a certain length to apply a minimum retention force to the DUT solder ball, which inherently thickens the socket body and introduces undesirable signal losses to the system. Notably, with this conventional contact technology, performance is generally limited to about 24 GHz.

Use of the cantilevered beam technology also imposes additional problems, particularly for use with high performance integrated circuits. For instance, the cantilever-style contacts tend to suffer from undesirable signal reflection and insertion loss due to the elongated irregular shape of the cantilevered beam. The irregular shape of the cantilever beam also causes variation in the dielectric area from signal entry to exit, thus making impedance matching more difficult. Still further, the cantilever-style contacts can move/tilt within their socket openings, resulting in improper positioning of the contacts when soldered to the main PCB and subsequent damage thereto upon insertion of a new device.

Conventional BGA sockets with cantilever-style contacts are also difficult to reconfigure to accommodate integrated circuits having different size solder balls. The irregularly shaped cantilevered beams must be stamped from metal and can only be reconfigured using expensive hard tooling, which makes the use of this style contact less versatile.

Also, the solder balls of BGA circuits are not always well-rounded with distinct equators over which the cantilevered-style contacts are meant to grip. There is currently no effective means available to adapt conventional cantilevered-style contacts to incorporate a retention feature of any type for situations where the solder ball equator is less defined.

Finally, many devices under test require capacitors and resistors for proper operation. Those types of electrical components need to be close to device in order to maintain power integrity. Capacitors must also be distributed near the required loads to provide high speed current. However, this cannot be provided using the existing cantilevered-style socket system, as any such components must be incorporated into the main PCB, separated from the DUT by the socket assembly. Therefore, the current contact technology has limited effectiveness in such situations.

The foregoing problems and other disadvantages associated with conventional cantilevered-style socket contacts make the use thereof less versatile and effective, particularly with advances in high performance integrated circuits. Accordingly, it is evident that there is a distinct need in the industry for an improved socket contact solution which resolves the many limitations of conventional test sockets and provides enhanced performance characteristics for use with high performance integrated circuits.

SUMMARY

With the foregoing in mind, one object of the present invention is to avoid the cantilevered beam contact approach altogether for BGA test sockets and provide a compression contact socket solution which establishes a much shorter trace connection between the DUT and main PCB, thus reducing the inherent signal losses associated with conventional socket connections and significantly enhancing the performance speed of the circuit.

Another object is to provide such an improved compression contact socket with a more uniform cross-sectional contact shape that will improve impedance matching capabilities and limit the undesirable signal reflection and insertion loss caused by the elongated irregular shape of conventional cantilevered beam contact technology.

Still another object of the present invention is to provide a socket contact which is not susceptible to canting or other misalignment issues, and which facilitates daisy-chain testing of electrical components without damaging the electrical contacts of the test socket. In this regard, it is also a goal to provide such a compression-type contact which is more easily reconfigurable to accommodate integrated circuits with circuit contacts of different size and configuration.

Another object of the present invention is to design such a test socket as a PCB itself, such that required capacitors and resistors may be embedded therein for close positioning to the DUT, thus improving power integrity and providing greater operating current speeds for high performance circuits. In this manner, as will be described further herein, it is also contemplated that each contact may optionally be configured in the form of a coaxial transmission structure, which is unavailable with the present cantilevered-style contact approach.

Further yet, it is also an object to design such a socket to include or be capable of incorporating a retention feature for securing integrated circuits thereto which have less defined or irregular shaped circuit contact elements. It is a further goal to provide all of the foregoing benefits and improvements without increasing the required footprint of the DUT, thus ensuring smooth transition from testing to final production.

In furtherance of the foregoing objectives, the present invention incorporates a novel approach to test socket technology for integrated circuits which utilizes a conductive compression contact instead of the conventional cantilevered-type beam approach. In the present invention, the test socket has a main body portion constructed of an underlying PCB substrate with an overlaying insulative socket housing affixed thereto. The underlying PCB substrate includes an array of filled vias extending therethrough which are arranged to align with the array of electrical circuit contacts protruding from a DUT, such as the solder balls of an integrated circuit incorporating BGA technology. Adhered to the top surface of each filled via is an electrically conductive compression contact, preferably constructed of an elastically compressible material in the form of a small electrically conductive elastomer button (e.g., ~75 μm thick). The lower end of each filled via terminates in a small solder ball attachment which is used to establish a solder connection to the main PCB of the circuit.

The insulative socket housing, in turn, overlays the PCB substrate and is adhered thereto. The socket housing includes an array of generally cylindrically shaped socket apertures or openings extending through the body thereof which are configured to align with the array of filled vias and compression contacts of the PCB substrate. One or more flexible retention members formed in the upper peripheral portions of each socket aperture of the housing function to grip and hold the contacts of a DUT firmly against the conductive compression contacts of the test socket when inserted therein. Accordingly, with this configuration, electrical connectivity is effectively established from the array of DUT contacts, through the conductive compression contacts and associated filled vias in the PCB substrate, to the main PCB.

With the present configuration, no elongated, flexing, cantilevered arms are necessary to make an electrical connection. The socket housing grips and retains the protruding circuit contacts of the DUT in firm engagement with the associated compression contacts of the PCB substrate. Thus, the compression contacts may be kept at minimal thickness and the filled vias may be shortened considerably, which effectively shortens the overall signal pathway between the DUT and the main PCB. Moreover, the compression contacts and associated filled vias may be constructed with a relatively uniform cylindrical cross section, which can be easily adjusted to optimize impedance matching where necessary. All of the foregoing features help to substantially reduce signal loss and signal reflection associated with prior cantilevered beam contacts and has been found to significantly enhance the performance speed of the circuit.

In addition to the above, since the socket body itself is constructed in the form of a PCB, it can include multiple layers of power and ground planes. This allows resistors and capacitors to be embedded within the PCB substrate closer to the DUT for improved power integrity and current speed for high performance circuit demands. The cylindrical shape of such contacts and vias also facilitates configuration of the filled vias as a coaxial structure, if so desired. Here again, none of this is possible using the conventional cantilevered beam contacts technology.

With the present construction, a conductive compression contact is secured firmly to each filled via of the PCB substrate at the base of each associated socket aperture. As such, it will not become canted or move within the socket upon insertion of a DUT and is less susceptible to damage than conventional cantilever-style beam contacts.

The foregoing and additional features and advantages of the present invention will be more readily apparent from the following detailed description. It should be understood, however, that the description and specific examples herein are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 9A is a transparent close-up perspective view of a socket housing similar to that shown in FIG. 6, showing an alternative embodiment of a conductive compression contact with a central slit to help accommodate solder ball reception and reduce resistive push back force;

FIG. 9B is a transparent close-up perspective view similar to that shown in FIG. 9A, showing another alternative configuration of a conductive compression contact with a pair of cross central slits.

DETAILED DESCRIPTION

Figure 1A:
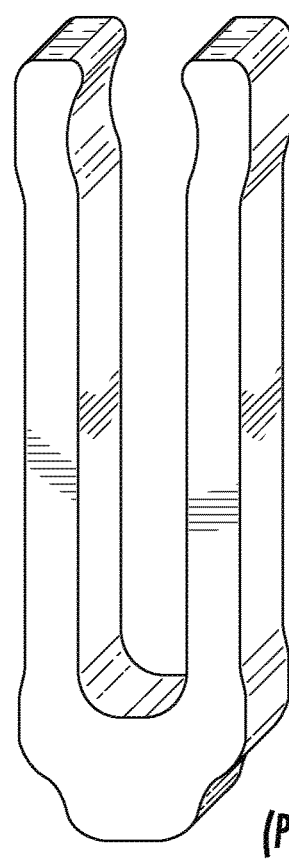
FIG. 1A is a perspective view of a prior art cantilevered beam style electrical contact currently used in BGA test sockets for integrated circuits.

The following description is merely exemplary in nature and is not intended to limit the present disclosure, application, or uses. It should be understood that throughout the drawings, corresponding reference numerals indicate like or corresponding parts and features. Furthermore, while the following discussion has particular relevance to and shall focus on test sockets for integrated circuits utilizing BGA contact mounting technology, it will be appreciated and understood that the present invention is equally pertinent and applicable to test sockets designed to accommodate other pin grid array type circuits with protruding conductive interconnection contact pins.

Figure 1B:
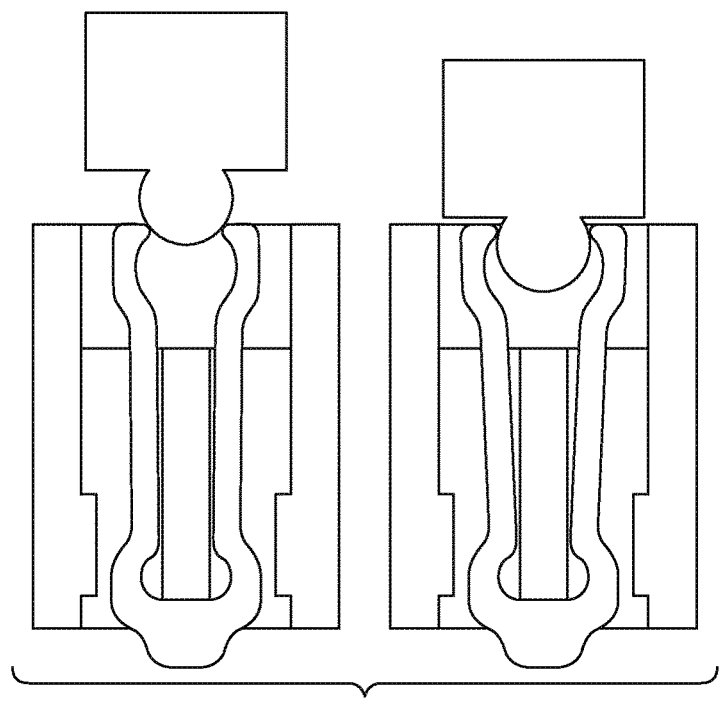
FIG. 1B is a pair of cross-sectional views showing a test socket incorporating the cantilevered beam style contact as shown in FIG. 1A, and showing the manner in which a solder ball contact of a BGA device is engaged thereby.

As noted above and shown in FIGS. 1A-1C, present-day contact technologies used for BGA test sockets typically employ a stamped metal cantilever beam known as a "Grypper" which extends through the body of the socket and connects each BGA solder ball of a DUT to the main PCB. As discussed previously, many performance issues and other problems are associated with the use of these types of contacts due to their elongated irregular shape and flexible cantilever action. The present invention incorporates a novel approach to test socket technology which incorporates a conductive compression contact and PCB substrate to resolve many of the problems associated with conventional cantilevered beam contacts.

Figure 2A:
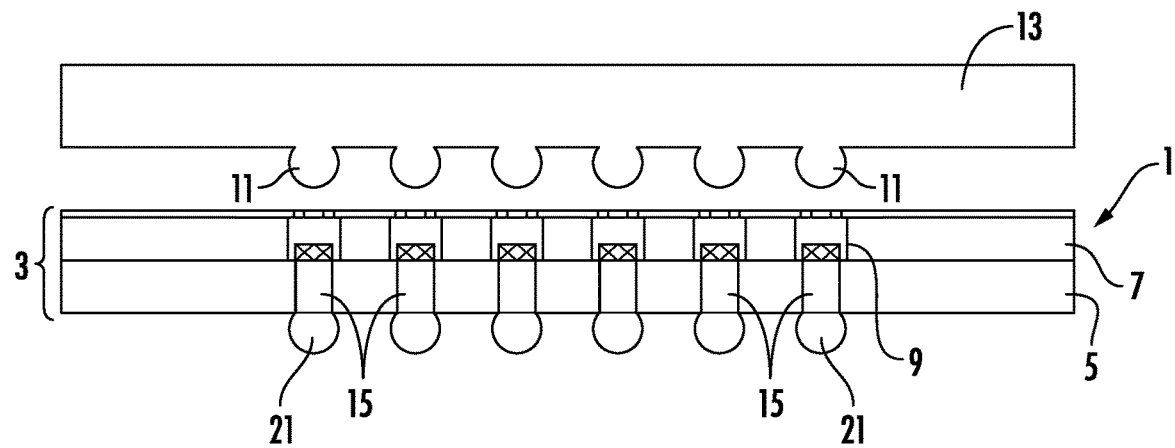
FIG. 2A is a cross-sectional view of a BGA test socket constructed in accordance with the present invention, with a BGA test device positioned for insertion therein.
Figure 2B:
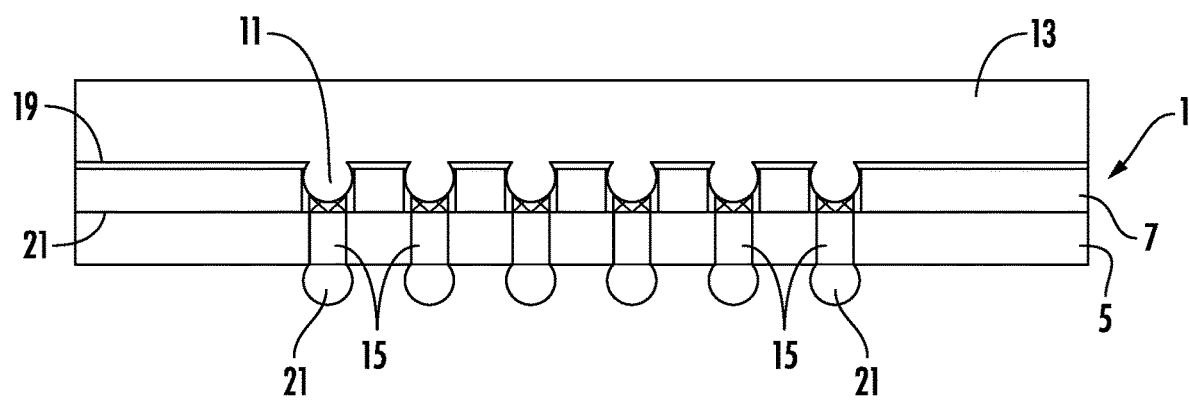
FIG. 2B is a cross-sectional view of the BGA test socket of FIG. 2A with the BGA test device inserted therein in engaging relation.

With reference to FIGS. 2A and 2B, it can be seen that the BGA test socket 1 of the present invention has a main body portion 3 which is comprised of an underlying substrate 5 constructed as a PCB, with an overlying BGA insulative socket housing 7 affixed thereto. The socket housing 7 includes an array of generally cylindrically shaped socket apertures or openings 9 which extend therethrough and are configured to align with and receive an array of solder ball contacts 11 of a particular device under testing (DUT) 13. FIG. 2A shows the DUT 13 aligned with the socket apertures 9 of housing 7 just prior to being connected to the test socket 1, and FIG. 2B shows the DUT 13 connected to the test socket 1 with the solder ball contacts 11 of the DUT 13 inserted within the associated apertures 9 of the housing 7.

Figure 3:
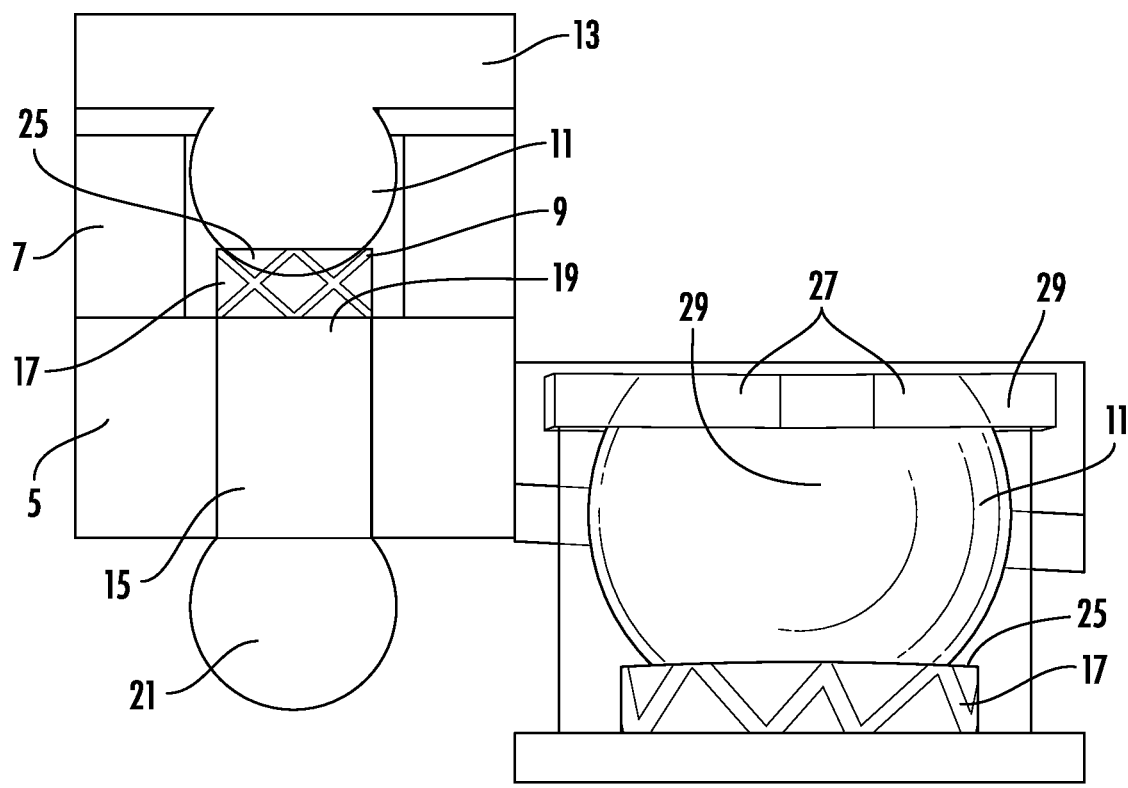
FIG. 3 is a close-up cross-sectional view of one conductive compression contact from the test socket of FIG. 2B, with an accompanying blown-up view showing the solder ball of a BGA test device inserted within the socket aperture thereof.

The underlying PCB substrate 5 of the socket body 3 includes an array of electrically conductive filled vias 15 extending therethrough which are arranged to align with the socket apertures 9 of housing 7, and consequently the array of solder balls 11 of the DUT 13. As best seen in FIG. 3, adhered to the top surface 19 of each filled via 15 in the PCB substrate 5 is an electrically conductive compression contact 17. As seen throughout the drawings, the lower end of each filled via 15 terminates in a small solder ball attachment 21 which is used to establish a solder connection to the main PCB of the circuit (not shown). Accordingly, electrical connectivity is effectively established from the array of DUT solder ball contacts 11, through the conductive compression contacts 17 and associated filled vias 15 in the PCB substrate 5, to the main PCB.

In the present embodiment, it is contemplated that compression contact 17 be preferably constructed of a resiliently compressible elastic material such as an electrically conductive elastomer, e.g., silicon rubber embedded with silver particles, silicone rubber embedded with silver plated nickel particles, or silicone rubber embedded with gold plated nickel particles. Without limitation, other electrically conductive elastomers are also conceivable, and it is further contemplated that such a compression contact 17 could take the form of any electrically conductive spring or hybrid spring/elastomer combination, or other conductive compression mechanism, without departing from the invention herein.

Figure 4:
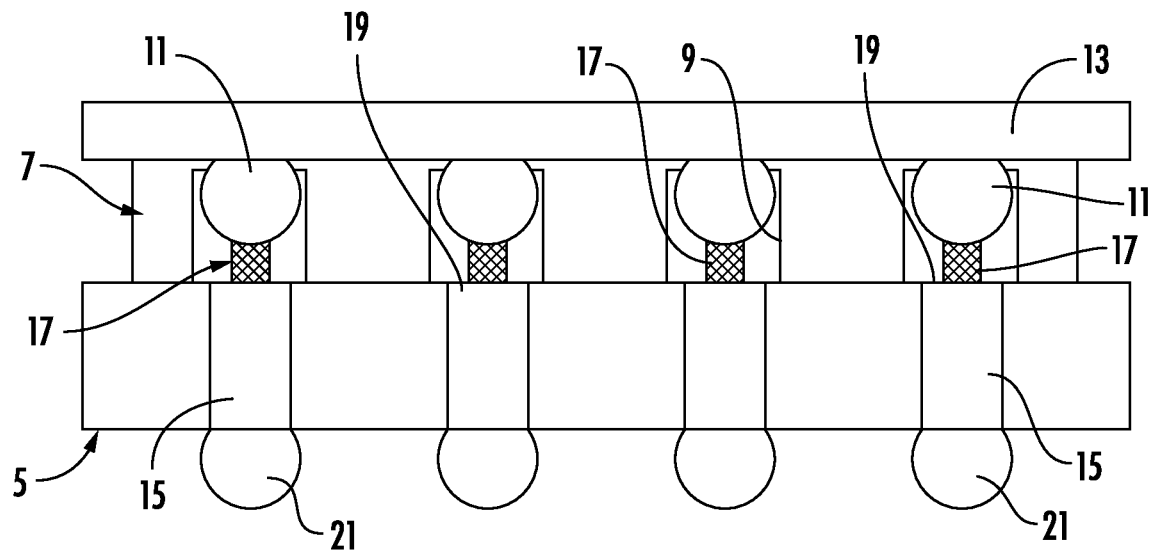
FIG. 4 is a close-up cross-sectional view of a BGA test socket similar to that shown in FIG. 2B, showing one embodiment where the conductive compression contact is affixed to the top of the filled via of the PCB substrate.

As shown in FIGS. 3 and 4, in one preferred embodiment, it is contemplated that each contact 17 may take the form of a small generally cylindrically shaped electrically conductive elastomeric button, approximately 75 μm thick. In this embodiment, the contact 17 may be screen printed to the top end 19 of an associated via 15 of the PCB substrate 5. The size of the elastomer button 17 can also be readily configured to accommodate various solder ball sizes of different DUTs. Since the contacts 17 have a more simplified, uniform cylindrical shape, such reconfiguration can be accomplished with relative ease using only soft tooling. Conventional stamped cantilevered beam shaped contacts, on the other hand, can only be reconfigured using expensive hard tooling.

Figure 5:
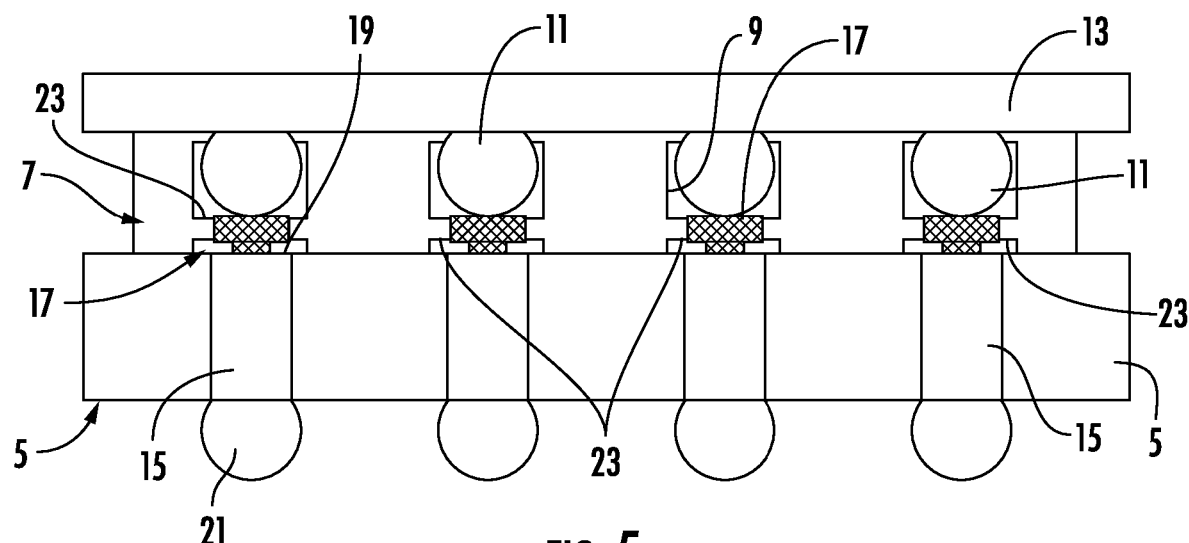
FIG. 5 is another close-up cross-sectional view of a BGA test socket incorporating the principles of the present invention, showing an alternative embodiment where the conductive compression contact is held in a separate carrier formed in each socket aperture of the housing.

In an alternative embodiment, as shown in FIG. 5, it is further contemplated that the compression contact 17 could be held in a separate carrier 23 formed in each socket aperture 9 of the housing 7, and laminated to the PCB substrate 5. Other manners of connecting such a conductive elastomeric contact 17 may also be possible without departing from the invention herein. Regardless of how secured, however, it should be understood that the size of such contact 17 may vary depending on the specific performance requirements and needs of a particular application.

As shown best in FIG. 3, the upper surface 25 of the elastomeric contact 17 may have a concave or other contoured surface formed to coincide and mate with the generally spherical shape of an associated solder ball 11 of a DUT 13. Forming such a seat for the solder ball contact 11 in the contact 17 may help to provide improved surface area contact and better electrical connectivity for standard ball-shaped solder contacts. However, it is also contemplated that the upper surface could be made flat which would allow more compliance range if the solder ball 11 has height variations.

As seen in FIG. 2A thru FIG. 6, the insulative socket housing 7 of test socket 1 overlays the PCB substrate 5 and is adhered thereto. The housing 7 is preferably constructed of an electrically insulative material, such as PEEK, Polyimide, Polyamide, FR4/5, G10, or other insulated materials that can withstand reflow temperatures of at least about 230 degrees Centigrade. The housing 7 may be attached to the PCB substrate 5 by any suitable means known in the industry.

Figure 6:
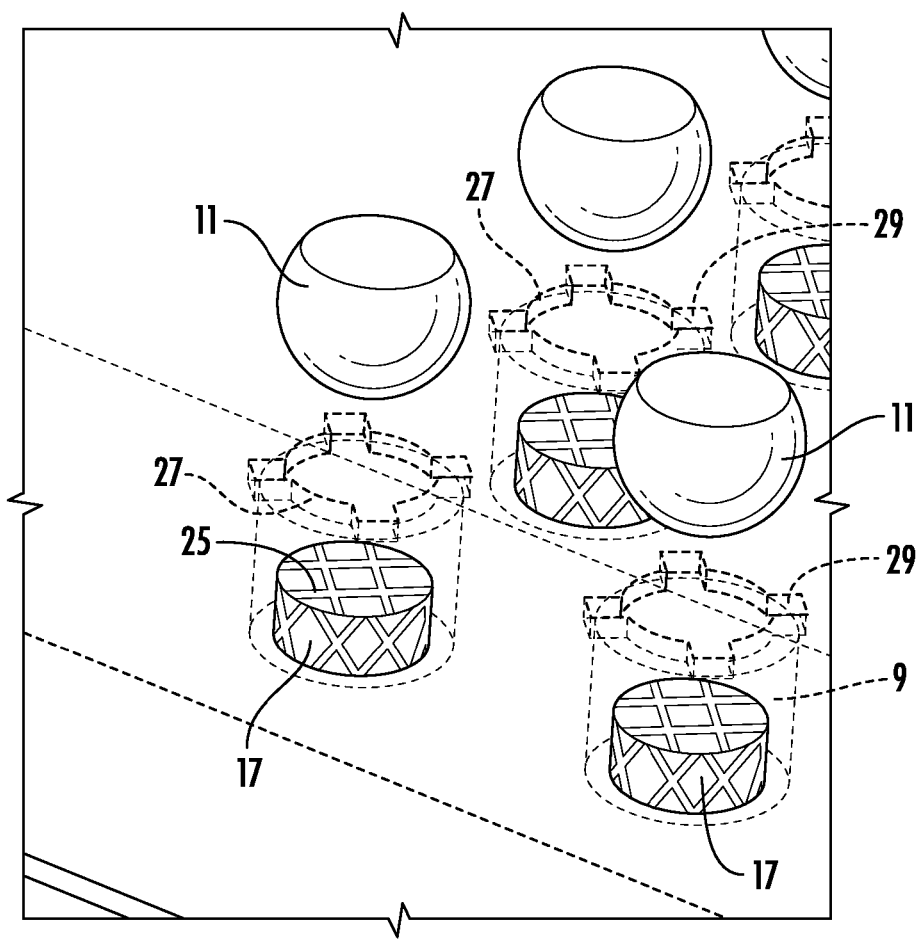
FIG. 6 is an exploded transparent close-up perspective view of a socket housing similar to that shown in FIG. 2A thru FIG. 4, showing the flexible retention members formed in the upper periphery of each socket aperture and an electrically conductive elastomer contact positioned at the base thereof.
Figure 7:
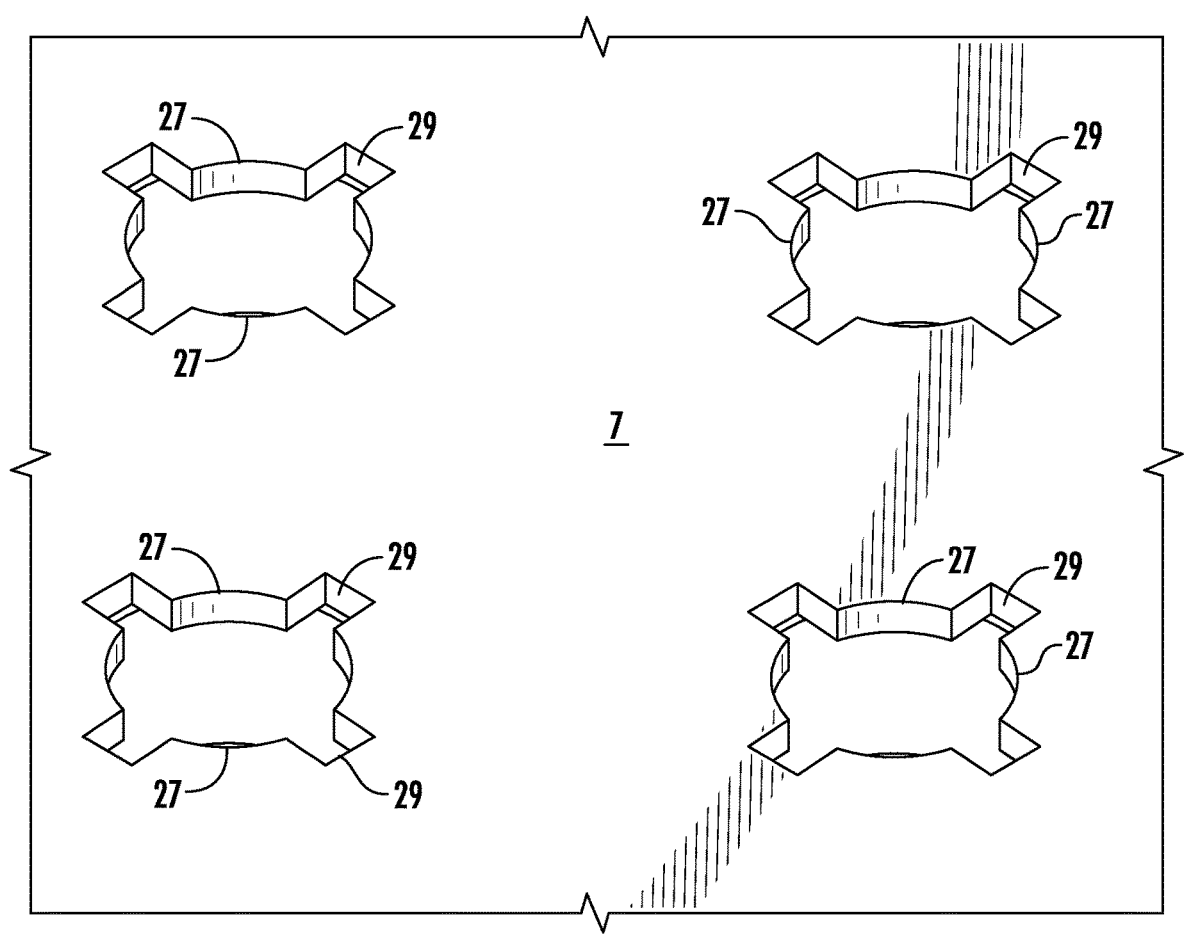
FIG. 7 is a close-up perspective view of a portion of a socket housing showing one embodiment of a plurality of flexible retention members formed in the peripheral edge of each socket aperture for receiving in snap-locking relation the solder ball contacts of a BGA test device.

As shown best in FIGS. 6 and 7, one or more flexible, resilient retention members or flaps 27 are formed in housing 7 at the upper peripheral portions 29 of each socket aperture 9. The retention flap(s) 27 protrude inwardly from the periphery 29 so as to constrict a portion of the top entryway to socket aperture 9 to a diameter slightly less than the maximum diameter of a solder ball 11 at its equator. As such, upon insertion of a DUT 13 into the test socket 1, the retention flap(s) 27 associated with each socket aperture 9 are caused to flex downwardly toward the compression contact 17 and outwardly over the equator of the ball contact 11, thus permitting the solder ball 11 to enter the socket aperture 9. As shown best in FIG. 3, once inserted, the retention flap(s) 27 resiliently flex back inwardly to close upon the solder ball contact 11 at a point which is slightly over-dead-center relative to the solder ball equator. In this manner, the flexible retention flaps(s) 27 function to grip and hold the solder ball contacts 11 of a DUT 13 firmly against the upper surface 25 of the conductive compression contacts 17 of test socket 1.

Figure 8A:
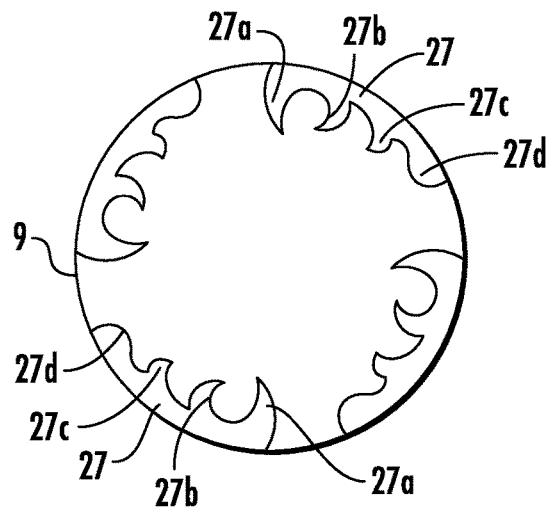
FIG. 8A is a top plan view showing an alternative embodiment of the flexible retention members formed in each socket housing which are configured to help accommodate solder balls of varying sizes.
Figure 8B:
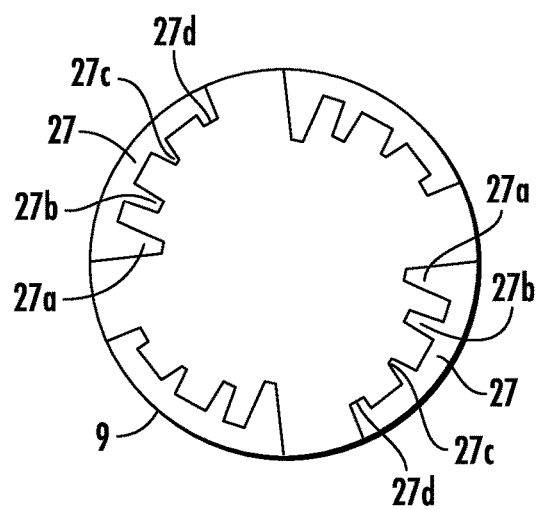
FIG. 8B is a top plan view of yet another alternative embodiment of the flexible retention members shown in FIG. 8A which are configured to help accommodate solder balls of varying sizes.
Figure 8C:
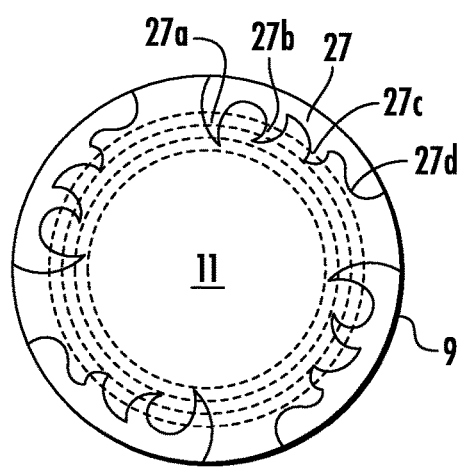
FIG. 8C is a top plan view of the retention flaps shown FIG. 8A, showing how the flaps are sized appropriately to accommodate varying sizes of different solder balls and provide the desired retention force therefor.

In previous embodiments, the retention flaps 27 have been substantially equal in size and shape, and the size and number of flaps included may vary depending on the application at hand. With reference to FIGS. 8A-8C, however, it is contemplated that other retention flap configurations may be useful to further adapt to various situations. For instance, it is known that sizing tolerance variations tend to cause typical solder ball contacts to vary in diameter within a DUT array itself and often between different DUTs. Therefore, solder ball sizes may be represented with diameter tolerances, e.g., nominal Ø 0.3±0.025 mm.

To accommodate for varying sizes of solder ball contacts 11 and to ensure a proper connection and retention force, the flaps 27 may alternatively be formed as a series of fingers or smaller sub-flaps 27a, 27b, 27c, and 27d of differing sizes which protrude radially inward from the upper periphery 29 of the socket opening 9 to establish differing diameters based on the represented solder ball tolerances. Such flaps could be a series of individual flaps of varying sizes, or a series of sub-flaps as shown in FIGS. 8A and 8B. Of course, more or less flaps/sub-flaps could be used depending on the needs of the application.

FIGS. 8A and 8B show two possible alternative adaptations of retention flaps 27 with different sub-flap configurations 27a, 27b, 27c, and 27d. In FIG. 8A, the sub-flaps are slightly arcuate and more pointed in shape at their free ends, with the larger/longer sub-flaps 27a curving opposite to that of the remaining sub-flaps 27b, 27c, and 27d. In the embodiment of FIG. 8B, the sub-flaps are less curved and slightly more squared off at their free ends, and perhaps slightly stiffer than the sub-flaps of the embodiment shown in FIG. 8A. In each embodiment, sub-flaps 27a extend inwardly the furthest, thus establishing a minor diameter for the socket opening 9. In progression, each of the sub-flaps 27b, 27c, and 27d protrude radially inward slightly less, thus establishing a slightly larger diameter opening at that point to help accommodate solder ball contacts 11 of larger diameter (typically based on prescribed solder ball tolerances). Of course, each of the sub-flaps 27a, 27b, 27c, and 27d could be constructed as individual protruding flaps without departing from the invention herein.

Figure 8D:
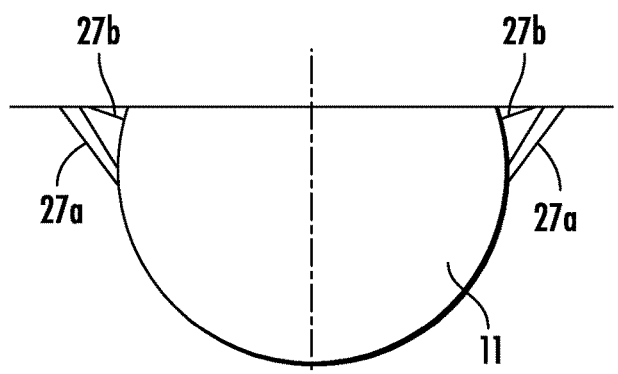
FIG. 8D is a close-up side elevation view showing the manner in which a solder ball is retained within the socket of a socket housing (partial view only) by the varying size retention flaps shown in either FIG. 8A or 8B

As shown best in FIGS. 8C and 8D, the longer sub-flap 27a is designed to protrude inwardly enough so as to ensure a proper interference fit with even the smallest diameter of solder ball contact 11 upon insertion thereof within socket opening 9. By way of example, FIG. 8C shows one possible configuration for accommodating a solder ball contact 11 having a nominal diameter of 0.3±0.025 mm. Larger solder ball contacts 11 (e.g., Ø 0.325 mm) will be engaged and held in place by one of more of the sub-flaps 27a-27d. For smaller solder ball contacts 11 on the low end of the tolerance range (e.g., Ø 0.275 mm), it is seen that sub-flap 27a constricts the diameter of the entryway to socket opening 9 enough to ensure that the smaller contact 11 will also be engaged by the retention flaps 27 and properly retained with sufficient engaging force against compression contact 17.

As shown in FIG. 8D, upon insertion of a solder ball 11 within the socket opening 9, the longer sub-flap(s) 27a (and possibly other sub-flaps 27b-27d, depending on the diameter of the solder ball contact 11 being inserted) will be bent downwardly toward the compression contact 17. As the solder ball 11 progresses into the socket opening 9, the sub-flap(s) ultimately pass over-dead-center relative to the solder ball equator. At this point, the sub-flap(s) which are long enough to reach the solder ball contact 11 will bear against the contact 11 and resist countermovement thereof in the opposite release direction. Consequently, as shown in FIG. 8D, at least the longer sub-flap(s) 27a will function to hold the inserted solder ball contact 11 in stable engagement with against the compression contact 17.

As further shown in FIG. 8D, depending again upon the size of the solder ball contact 11, at least some of the remaining shorter sub-flaps 27b, 27c, and 27d may also resiliently flip back to their original position, or bend slightly in an opposite direction, to bear against the solder ball contact 11 at a position slightly spaced from sub-flap 27a, thus helping to further stabilize and lock it in place between the longer and shorter sub-flaps. Accordingly, the sub-flaps 27a-27d are adapted to engage the solder ball contact 11 at multiple spaced locations upon its outer surface, essentially cupping the solder ball contact 11 therebetween. Such a design helps provide for a minimum interference fit between the solder ball contact 11 and the socket aperture 9 and stabilize the solder ball contact 11 within the socket aperture 9 under a suitable retention force. It will also be appreciated that the sub-flaps 27a-27d may flex from 0-90 degrees relative to the plane of socket opening 9 upon insertion of a solder ball contact 11, depending on the diameter tolerance variation thereof. In a preferred system, the sub-flaps 27a-27b will establish a required retraction force which is equal to or preferably exceeding the required insertion force of the solder ball contact 11.

By using the socket housing 7 to grip and retain the solder ball contacts 11 of the DUT 13 in firm engagement with the associated compression contacts 17 of the PCB substrate, the path of electrical connectivity between the DUT 13 and main PCB is substantially simplified. No elongated, flexing, cantilevered arms are necessary to make the electrical connection, as with the cantilevered beam contacts of the prior art. With the present configuration, the compression contacts 17 may be kept at minimal thickness (i.e., ~75 µm), and the filled vias 15 of the PCB substrate 5 can be shortened considerably. This effectively shortens the overall signal pathway between the DUT 13 and main PCB. This not only substantially reduces signal loss and signal reflection commonly associated with prior cantilevered beam contacts, but has also been found to significantly enhance the performance speed of the circuit beyond 50 GHz.

Moreover, with the configuration of the present invention, both the compression contact 17 and filled via 15 associated with each socket aperture 9 of the housing 7 may be constructed with a relatively uniform cylindrical cross section. Here again, contrary to the conventional cantilevered beam contact technology, this uniform cylindrical cross-sectional configuration provides significant improvement for the transmission of signals and performance speed of the circuit. Additionally, it also permits the size of the compression contacts 17 and filled vias 15 to be adjusted and optimized with relative ease for purposes of impedance matching, which is not possible using the conventional cantilevered beam contacts.

As shown in FIGS. 9A and 9B, in still other alternative embodiments, it is contemplated that the elastomeric compression contact 17 may be split into separate sections, such as in two halves or four quarters, to provide enhanced flexibility and reduced push-back force on the solder ball contact 11. In the embodiment of FIG. 9A, the elastomeric compression contact 17 is formed with a central split to create two opposing conductive elastic contact sections 17a and 17b. In FIG. 9B, the elastomeric compression contact 17 is split cross-wise so as to form four spaced elastomeric compression contact sections 17c, 17d, 17e, and 17f. The compression contact 17 may be split completely through its body, as shown, or just partially to provide added flexibility and greater gripping ability.

Figure 9C:
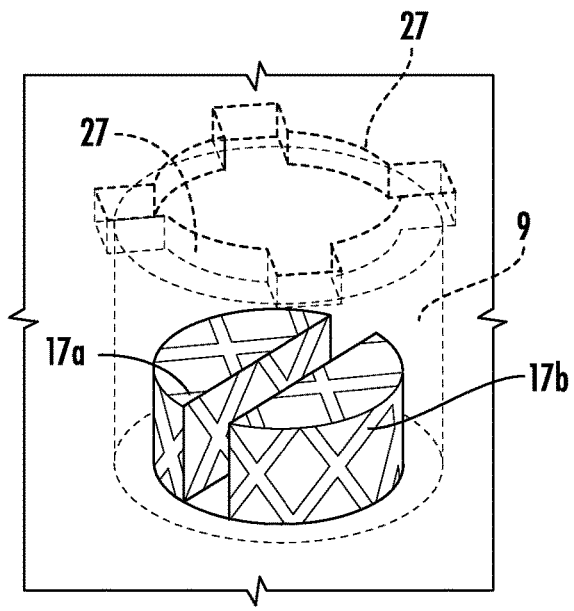
FIG. 9C is a close-up side elevation view of a test socket incorporating a socket housing configured with the alternative conductive compression contact of either FIG. 9A or 9B, with the socket housing broken away to better see the compression contact seated therein.
Figure 9C:
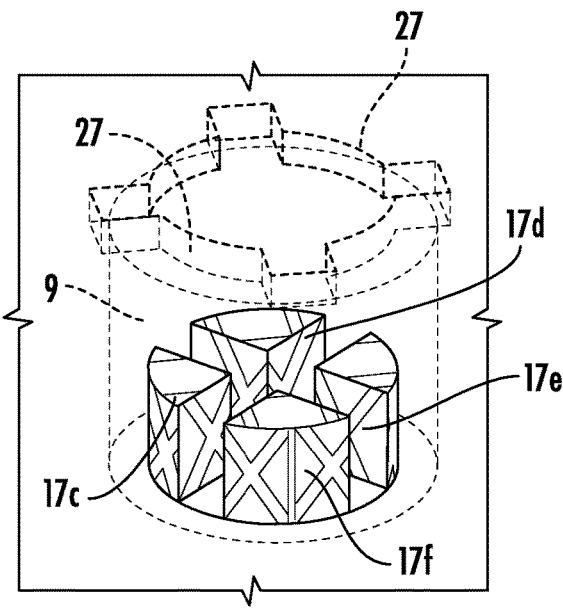
Figure 9C:
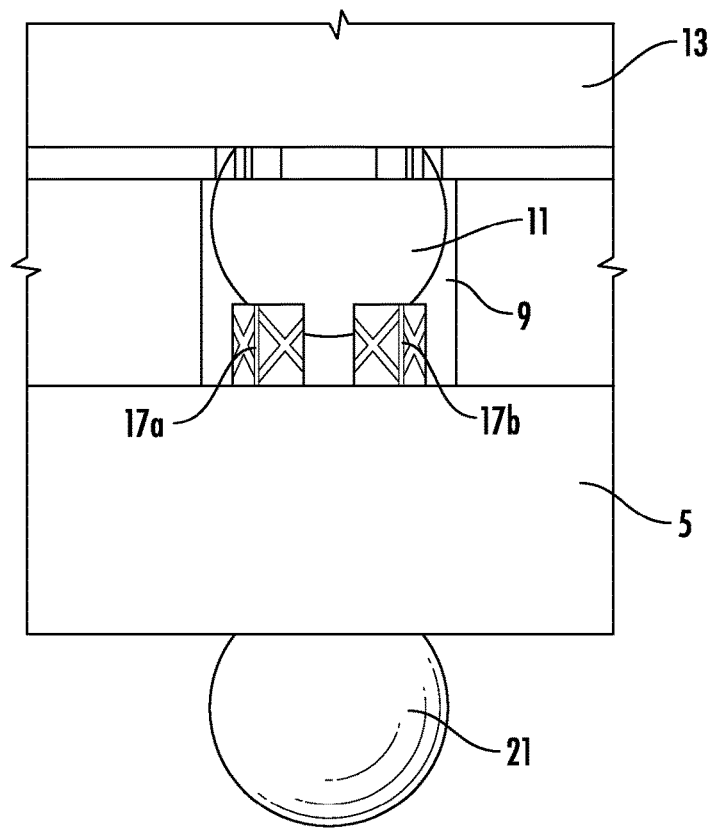

As best seen in FIG. 9C, when the solder ball contact 11 engages the compression contact 17 with a downward force, the elastomeric halves 17a, 17b (FIG. 9A) or quarters 17c-17f (FIG. 9B) will deform outward and around a lower circumference of the solder ball 11, thus gripping the ball and providing a somewhat lesser push-back connecting force than the full body elastomeric compression contact 17. Since the central split allows for more give and relaxation, the push-back forced is reduced for use in applications which may require such lower contact force in their specifications. Of course, other and additional configurations of the elastomeric compression contact 17 are certainly conceivable for achieving varying push-back forces and stabilizing characteristics without departing from the invention herein.

Since the socket body 3 itself is essentially constructed in the form of a PCB, i.e., PCB substrate 5, it can include copper traces and multiple layers of power and ground planes, which provides substantial additional benefits and improvements over the conventional cantilever-type socket contact technology. As a PCB, resistors and capacitors (not shown) can be embedded inside the PCB substrate 5, which advantageously positions such components closer to the DUT 13. This helps to improve power integrity and current speed for high performance circuit demands. Embedded capacitance in the PCB substrate of the test socket 1 also provides additional benefits beyond just performance and EMC (electromagnetic capability) enhancements. It can be utilized to reduce the assembled product cost, increase manufacturing quality, increase long term reliability, and reduce the overall size of the main PCB.

As a PCB, the filled vias 15 of the PCB substrate 5 may also be configured as a coaxial structure, if so desired. Due to the cylindrical shape of the vias 15 and conductive compression contact 17, each contact forms a signal that can be surrounded by a ground shield using a dedicated ground plane in the internal layers of the PCB substrate and a flooded ground plane on the external layers. Here again, this is not possible using the conventional cantilevered beam contacts technology.

With the present construction, the conductive compression contact 17 is secured firmly to each filled via 15 of the PCB substrate 5 adjacent the base of each associated socket aperture 9 in housing 7. As such, it will not become canted or move within the socket housing 7 upon insertion of a DUT 13, and consequently is less susceptible to damage than the conventional cantilever-style beam contacts. This ensures that the test socket 1 can be used and reused for daisy-chain testing of multiple DUTs without concern of damage or misalignment issues. Moreover, the socket configuration of the present invention requires zero additional footprint to implement, and the socket housing 7 is fully adaptable to include other and additional retention features to facilitate connection to a variety of different style integrated circuits.

The disclosure herein is intended to be merely exemplary in nature and, thus, variations that do not depart from the gist of the disclosure are intended to be within the scope of the disclosure. Such variations are not to be regarded as a departure from the spirit and scope of the disclosure, which comprises the matter shown and described herein, and set forth in the appended claims.

We claim:

1. A socket device for use in retaining an electronic circuit device for testing, comprising:
   (a) a substrate constructed primarily of an electrically insulative material, said substrate including an array of electrically conductive vias extending between a first surface and a second surface of said substrate;
   (b) an electrically insulative housing overlaying at least a portion of said first surface of said substrate, said electrically insulative housing having an array of socket apertures extending therethrough which align with said array of electrically conductive vias in said substrate;
   (c) a compression contact, being resiliently compressible and electrically conductive, seated within a socket aperture of said array of socket apertures in electrical contact with one of said array of electrically conductive vias in said substrate; and
   (d) at least one retention member formed in said housing along peripheral portions of said socket aperture, said retention member being spaced from said compression contact a distance sufficient to permit said retention member to hold a protruding circuit contact of the electronic circuit device in engaging relation against said compression contact and resist withdrawal of said protruding circuit contact from said socket aperture upon insertion of said protruding circuit contact therein.

2. The socket device set forth in claim 1, wherein said compression contact is formed at least in part of an elastomeric material embedded with electrically conductive particles.

3. The socket device set forth in claim 1, wherein said compression contact is constructed in the form of a small elastic button having a generally uniform cylindrical cross section throughout and a contact surface which traverses a substantial portion of said socket aperture.

4. The socket device set forth in claim 1, wherein said compression contact has a contoured contact surface which helps position and stabilize said protruding circuit contact of the electronic circuit device.

5. The socket device set forth in claim 1, wherein said compression contact is split into multiple flexible sections which surround a circumference of said protruding circuit contact of the electronic circuit device.

6. The socket device set forth in claim 1, wherein said retention member is comprised of a plurality of flexible flaps which protrude inwardly from said peripheral portions of said socket aperture.

7. The socket device set forth in claim 6, wherein at least one of said plurality of flexible flaps is sized differently than other of said plurality of flexible flaps to accommodate said protruding circuit contact having differing dimensions.

8. The socket device set forth in claim 6, wherein at least one of said plurality of flexible flaps is comprised of a plurality of sub-flaps of varying sizes to accommodate said protruding circuit contact having differing dimensions.

9. The socket device set forth in claim 6, wherein at least one of said plurality of flexible flaps constricts the diameter of said socket aperture at said peripheral portions thereof to a diameter which is slightly less than a corresponding maximum diameter of said protruding circuit contact received therein.

10. The socket device set forth in claim 9, wherein one of said plurality of flexible flaps is adapted to flex toward said compression contact when engaged by said protruding circuit contact, and another of said plurality of flexible flaps is adapted to engage said protruding circuit contact at a point spaced further from said compression contact to help stabilize said protruding circuit contact within said socket aperture.

11. The socket device set forth in claim 1, wherein said substrate is constructed in the form of a printed circuit board and each of said plurality of electrically conductive vias at said second surface thereof is electrically connected to a protruding electrical contact.

12. A socket device for use in retaining an electronic circuit device for testing, comprising:
(a) a socket body having an underlying substrate constructed in the form of a printed circuit board and an overlaying socket housing constructed of an electrically insulative material;
(b) said underlying substrate including a plurality of electrically conductive vias extending therethrough which mate with a plurality of socket apertures extending through said overlaying socket housing;
(c) each of said plurality of socket apertures in said overlaying socket housing having a base portion positioned adjacent to and communicating with a mating electrically conductive via of said plurality of electrically conductive vias in said underlying substrate, and a socket entryway spaced from said base portion which is adapted to receive a protruding circuit contact of the electronic circuit device therein;
(d) an electrically conductive contact, formed at least in part of an elastomeric material, seated within each of said plurality of socket apertures adjacent said base portion thereof in electrical contact with said mating electrically conductive via of said plurality of electrically conductive vias in said underlying substate; and
(e) at least one retention member formed in said overlaying socket housing along peripheral portions of said socket entryway of each of said plurality of socket apertures, said retention member being spaced from said electrically conductive contact seated within its corresponding socket aperture of said plurality of socket apertures a distance sufficient to permit said retention member, upon insertion of said protruding circuit contact through said socket entryway thereof, to hold said protruding circuit contact of the electronic circuit device in engaging relation with said electrically conductive contact seated therewithin and resist withdrawal of said protruding circuit contact therefrom.

13. The socket device set forth in claim 12, wherein said electrically conductive contact has a generally uniform cylindrical cross section throughout and a contact surface which traverses a substantial portion of the corresponding socket aperture of said plurality of socket apertures within which it is seated.

14. The socket device set forth in claim 13, wherein said contact surface is contoured to conform to a circumferential surface of said protruding circuit contact of the electronic circuit device which comes in contact therewith.

15. The socket device set forth in claim 12, wherein said electrically conductive contact is split into multiple flexible sections which are adapted to surround at least a portion of a circumference of said protruding circuit contact of the electronic circuit device with which it engages.

16. The socket device set forth in claim 12, wherein said retention member is comprised of a plurality of flexible protrusions which extend inwardly from said peripheral portions of said socket entryway of at least one of said plurality of socket apertures.

17. The socket device set forth in claim 16, wherein at least some of said flexible protrusions are sized differently than other said flexible protrusions to accommodate said protruding circuit contacts having differing dimensions.

18. The socket device set forth in claim 16, wherein at least some of said flexible protrusions include a set of fingers of differing lengths and said fingers of differing lengths engage a circumference of said protruding circuit contact at different locations along an axis extending between said socket entryway and said base portion of said at least one of said plurality of socket apertures when said protruding circuit contact is inserted therein.

19. A socket device for use in retaining an electronic circuit device for testing, comprising:
(a) a socket body having an underlying substrate constructed in the form of a printed circuit board with multiple layers of power and ground planes, and an overlaying socket housing constructed of an electrically insulative material;
(b) said underlying substrate including a plurality of electrically conductive vias extending therethrough which mate with a plurality of socket apertures extending through said overlying socket housing, at least some of said plurality of electrically conductive vias being electrically connected to at least some of said layers of power and ground planes in said underlying substrate;
(c) each of said plurality of socket apertures in said overlying socket housing having a base portion positioned adjacent to and communicating with a mating electrically conductive via of said plurality of electrically conductive vias in said underlying substrate, and having a socket entryway spaced from said base portion which is adapted to receive a protruding circuit contact of the electronic circuit device;

(d) a resiliently compressible electrically conductive contact seated within each of said plurality of socket apertures adjacent said base portion thereof in electrical contact with said mating electrically conductive via of said plurality of electrically conductive vias in said underlying substate;

(e) said resiliently compressible electrically conductive contact being constructed in the form of a small elastomeric button with a generally uniform cross-sectional configuration and a contact surface which traverses a substantial portion of the corresponding socket aperture of said plurality of socket apertures within which it is seated;

(f) a plurality of retention members protruding radially inwardly from said overlaying socket housing along peripheral portions of said socket entryway of each of said plurality of socket apertures, said plurality of retention members retaining said protruding circuit contact of the electronic circuit device in engaging relation with said electrically conductive contact seated within an associated socket aperture of said plurality of socket apertures and resisting withdrawal of said protruding circuit contact therefrom; and (g) said plurality of retention members having finger portions of differing lengths to accommodate and retain said protruding circuit contacts having differing dimensions.

20. The socket device set forth in claim 19, wherein said protruding circuit contact of the electronic circuit device is a solder ball contact and said contact surface of said electrically conductive contact is contoured to mate with a circumferential surface of said solder ball contact which comes in contact therewith.

21. The socket device set forth in claim 20, wherein said fingers portions of differing lengths engage said solder ball contact at different locations along an axis extending between said socket entryway and said base portion of each of said plurality of socket apertures when said solder ball contact is inserted therein.

22. A socket device for use in retaining an electronic circuit device for testing, comprising:

(a) a substrate constructed primarily of an electrically insulative material, said substrate including an array of electrically conductive vias extending between a first surface and a second surface of said substrate;

(b) an electrically insulative housing overlaying at least a portion of said first surface of said substrate, said electrically insulative housing having an array of socket apertures extending therethrough which align with said array of electrically conductive vias in said substrate;

(c) a compression contact, being resiliently compressible and electrically conductive, seated within a socket aperture of said array of socket apertures in electrical contact with one of said array of electrically conductive vias in said substrate;

(d) at least one retention member formed in said housing along peripheral portions of said socket aperture, said retention member being constructed to hold a protruding circuit contact of the electronic circuit device in engaging relation against said compression contact upon insertion thereof within said socket aperture;

(e) said retention member being comprised of a plurality of flexible flaps which protrude inwardly from said peripheral portions of said socket aperture; and (f) at least one of said plurality of flexible flaps being sized differently than other of said plurality of flexible flaps to accommodate said protruding circuit contact having differing dimensions.

23. A socket device for use in retaining an electronic circuit device for testing, comprising:

(a) a substrate constructed primarily of an electrically insulative material, said substrate including an array of electrically conductive vias extending between a first surface and a second surface of said substrate;

(b) an electrically insulative housing overlaying at least a portion of said first surface of said substrate, said electrically insulative housing having an array of socket apertures extending therethrough which align with said array of electrically conductive vias in said substrate;

(c) a compression contact, being resiliently compressible and electrically conductive, seated within a socket aperture of said array of socket apertures in electrical contact with one of said array of electrically conductive vias in said substrate;

(d) at least one retention member formed in said housing along peripheral portions of said socket aperture, said retention member being constructed to hold a protruding circuit contact of the electronic circuit device in engaging relation against said compression contact upon insertion thereof within said socket aperture;

(e) said retention member being comprised of a plurality of flexible flaps which protrude inwardly from said peripheral portions of said socket aperture; and (f) at least one of said plurality of flexible flaps is comprised of a plurality of sub-flaps of varying sizes to accommodate said protruding circuit contact having differing dimensions.

24. A socket device for use in retaining an electronic circuit device for testing, comprising:

(a) a substrate constructed primarily of an electrically insulative material, said substrate including an array of electrically conductive vias extending between a first surface and a second surface of said substrate;

(b) an electrically insulative housing overlaying at least a portion of said first surface of said substrate, said electrically insulative housing having an array of socket apertures extending therethrough which align with said array of electrically conductive vias in said substrate;

(c) a compression contact, being resiliently compressible and electrically conductive, seated within a socket aperture of said array of socket apertures in electrical contact with one of said array of electrically conductive vias in said substrate;

(d) at least one retention member formed in said housing along peripheral portions of said socket aperture, said retention member being constructed to hold a protruding circuit contact of the electronic circuit device in engaging relation against said compression contact upon insertion thereof within said socket aperture;

(e) said retention member being comprised of a plurality of flexible flaps which protrude inwardly from said peripheral portions of said socket aperture; and (f) at least one of said plurality of flexible flaps constricts the diameter of said socket aperture at said peripheral portions thereof to a diameter which is slightly less than a corresponding maximum diameter of said protruding circuit contact received therein.

25. The socket device set forth in claim 24, wherein one of said plurality of flexible flaps is adapted to flex toward said compression contact when engaged by said protruding circuit contact, and another of said plurality of flexible flaps is adapted to engage said protruding circuit contact at a point spaced further from said compression contact to help stabilize said protruding circuit contact within said socket aperture.

26. A socket device for use in retaining an electronic circuit device for testing, comprising:
- (a) a socket body having an underlying substrate constructed in the form of a printed circuit board and an overlaying socket housing constructed of an electrically insulative material;
- (b) said underlying substrate including a plurality of electrically conductive vias extending therethrough which mate with a plurality of socket apertures extending through said overlaying socket housing;
- (c) each of said plurality of socket apertures in said overlaying socket housing having a base portion positioned adjacent to and communicating with a mating electrically conductive via of said plurality of electrically conductive vias in said underlying substrate, and a socket entryway spaced from said base portion which is adapted to receive a protruding circuit contact of the electronic circuit device therein;
- (d) an electrically conductive contact, formed at least in part of an elastomeric material, seated within each of said plurality of socket apertures adjacent said base portion thereof in electrical contact with said mating electrically conductive via of said plurality of electrically conductive vias in said underlying substate;
- (e) at least one retention member formed in said overlaying socket housing along peripheral portions of said socket entryway of each of said plurality of socket apertures for retaining an associated said protruding circuit contact of the electronic circuit device in engaging relation with said electrically conductive contact seated therewithin;
- (f) said retention member being comprised of a plurality of flexible protrusions which extend inwardly from said peripheral portions of said socket entryway of each of said plurality of socket apertures; and
- (g) at least some of said plurality of flexible protrusions include a set of fingers of differing lengths and said fingers of differing lengths engage a circumference of said protruding circuit contact at different locations along an axis extending between said socket entryway and said base portion of each of said plurality of socket apertures when said protruding circuit contact is inserted therein.

27. A socket device for use in retaining an electronic circuit device for testing, comprising:
- (a) a socket body having an underlying substrate constructed in the form of a printed circuit board with multiple layers of power and ground planes, and an overlaying socket housing constructed of an electrically insulative material;
- (b) said underlying substrate including a plurality of electrically conductive vias extending therethrough which mate with a plurality of socket apertures extending through said overlying socket housing, at least some of said plurality of electrically conductive vias being electrically connected to at least some of said layers of power and ground planes in said underlying substrate;
- (c) each of said plurality of socket apertures in said overlying socket housing having a base portion positioned adjacent to and communicating with a mating electrically conductive via of said plurality of electrically conductive vias in said underlying substrate, and having a socket entryway spaced from said base portion which is adapted to receive a protruding circuit contact of the electronic circuit device;
- (d) a resiliently compressible electrically conductive contact seated within each of said plurality of socket apertures adjacent said base portion thereof in electrical contact with said mating electrically conductive via of said plurality of electrically conductive vias in said underlying substate;
- (e) said resiliently compressible electrically conductive contact being constructed in the form of a small elastomeric button with a generally uniform cross-sectional configuration and a contact surface which traverses a substantial portion of the corresponding socket aperture of said plurality of socket apertures within which it is seated;
- (f) a plurality of retention members protruding radially inwardly from said overlaying socket housing along peripheral portions of said socket entryway of each of said plurality of socket apertures for retaining an associated said protruding circuit contact of the electronic circuit device in engaging relation with said electrically conductive contact seated therewithin;
- (g) said plurality of retention members having finger portions of differing lengths to accommodate and retain said protruding circuit contact having differing dimensions;
- (h) wherein said protruding circuit contact of the electronic circuit device is a solder ball contact and said contact surface of said electrically conductive contact is contoured to mate with a circumferential surface of said solder ball contact which comes in contact therewith; and
- (i) said finger portions of differing lengths engaging said solder ball contact at different locations along an axis extending between said socket entryway and said base portion of each of said plurality of socket apertures when said solder ball contact is inserted therein.

\* \* \* \* \*